United States Patent
Kovach

(10) Patent No.: US 11,558,988 B2
(45) Date of Patent: Jan. 24, 2023

(54) ROTARY GROUND ENGAGING TOOL WITH DOUBLE LOOP BARBED LINKS

(71) Applicant: CNH Industrial America LLC, New Holland, PA (US)

(72) Inventor: Michael G. Kovach, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 326 days.

(21) Appl. No.: 16/555,154

(22) Filed: Aug. 29, 2019

(65) Prior Publication Data

US 2021/0059093 A1 Mar. 4, 2021

(51) Int. Cl.
*A01B 29/04* (2006.01)

(52) U.S. Cl.
CPC .................. *A01B 29/048* (2013.01)

(58) Field of Classification Search
CPC ....... A01B 29/048; A01B 19/08; F16G 13/00; F16G 13/15; B21L 11/14; B21L 11/08; B21L 11/00; B60C 27/0223
USPC ...................... 59/3, 14, 83, 87, 92
See application file for complete search history.

(56) References Cited

U.S. PATENT DOCUMENTS

| | | | | |
|---|---|---|---|---|
| 435,327 A * | 8/1890 | Smith, Jr. | ............... | F16G 13/14 59/92 |
| 544,759 A * | 8/1895 | Eisenhart | ................ | F16G 13/14 59/92 |
| 562,519 A * | 6/1896 | Ferris | ..................... | F16G 13/14 59/92 |
| 590,479 A * | 9/1897 | Griffith | ................... | F16G 13/14 59/92 |
| 599,232 A * | 2/1898 | Griffith | ................... | F16G 13/14 59/92 |
| 599,233 A * | 2/1898 | Griffith | ................... | F16G 13/14 59/92 |
| 862,470 A * | 8/1907 | Griffith | ................... | F16G 13/14 59/92 |

(Continued)

FOREIGN PATENT DOCUMENTS

EP 0 917 814 A2 5/1999
RU 2 073 389 C1 2/1997

(Continued)

OTHER PUBLICATIONS

"Kuhn Krause Gladiator Strip Till—Features and Benefits", Kuhn North America, found at https://www.youtube.com/watch?v=7jDujACA7n4, Oct. 24, 2013 (3 pages).

(Continued)

*Primary Examiner* — Jamie L McGowan
(74) *Attorney, Agent, or Firm* — Rebecca Henkel; Rickard DeMille

(57) ABSTRACT

A rolling basket assembly for an agricultural tillage implement. The rolling basket assembly includes a bracket, a first disk and a second disk rotatably connected to the bracket, a plurality of chain assemblies. Each chain assembly includes a first end connected to the first disk and a second end connected to the second disk and a plurality of links looped around one another and collectively forming each chain assembly. Each link includes a first loop, a second loop that is looped around the first loop, and at least one projection extending outwardly from one of the first loop and the second loop.

20 Claims, 3 Drawing Sheets

(56) References Cited

U.S. PATENT DOCUMENTS

| | | | | |
|---|---|---|---|---|
| 1,034,868 A * | 8/1912 | Breul | ................... | A44C 11/00 |
| | | | | 59/83 |
| 1,185,659 A * | 6/1916 | Hall | ................... | F16G 13/14 |
| | | | | 59/92 |
| 1,368,437 A * | 2/1921 | Hodell | ................... | F16G 13/14 |
| | | | | 59/92 |
| 1,635,385 A * | 7/1927 | Perry | ................... | B60C 27/08 |
| | | | | 59/92 |
| 1,712,688 A * | 5/1929 | Brown | ................... | A01B 19/08 |
| | | | | 172/388 |
| 1,883,000 A * | 10/1932 | Senft | ................... | B60C 27/08 |
| | | | | 152/245 |
| 2,223,942 A * | 12/1940 | Mckinnon | ............ | B60C 27/086 |
| | | | | 59/35.1 |
| 2,784,760 A * | 3/1957 | Harvey | ................ | B60C 27/086 |
| | | | | 152/245 |
| 2,893,451 A * | 7/1959 | Dickerson | ............... | B27L 1/122 |
| | | | | 144/208.7 |
| 3,126,865 A * | 3/1964 | Wiegardt, Jr. | ......... | A01K 80/00 |
| | | | | 119/234 |
| 3,282,318 A * | 11/1966 | Kare | ....................... | F16G 13/14 |
| | | | | 152/243 |
| 4,260,027 A * | 4/1981 | Langan | ................ | A01B 33/025 |
| | | | | 172/121 |
| 4,403,639 A * | 9/1983 | Holte | .................... | B60C 27/086 |
| | | | | 152/245 |
| 4,893,463 A * | 1/1990 | Woolford | ................ | B21L 99/00 |
| | | | | 59/27 |
| 4,919,211 A | 4/1990 | Cope | | |
| 5,000,270 A * | 3/1991 | Phillips | ................ | A01B 23/046 |
| | | | | 172/540 |
| 5,143,160 A * | 9/1992 | May | ........................ | A01B 19/08 |
| | | | | 172/311 |
| 5,293,916 A * | 3/1994 | Kucherry, Sr. | ...... | A01G 23/097 |
| | | | | 144/208.7 |
| 5,662,173 A * | 9/1997 | Blesing | .................. | A01B 21/04 |
| | | | | 172/526 |
| 6,484,812 B1 * | 11/2002 | Clark | ...................... | A01B 21/04 |
| | | | | 172/540 |
| 7,137,239 B2 * | 11/2006 | Paterson | ................. | A01B 19/08 |
| | | | | 59/85 |
| D554,578 S * | 11/2007 | Roed | ............................ | D12/608 |
| 7,594,546 B2 * | 9/2009 | Ankenman | ............ | A01B 29/06 |
| | | | | 172/540 |
| 7,942,210 B2 * | 5/2011 | Ankenman | ............ | A01B 35/16 |
| | | | | 172/540 |
| 8,387,713 B2 | 3/2013 | Maas et al. | | |
| 9,193,230 B2 * | 11/2015 | Schmid | ................. | B60C 27/086 |
| 10,138,936 B2 | 11/2018 | Blunier et al. | | |
| 2005/0262823 A1 * | 12/2005 | Paterson | .................. | F16G 13/00 |
| | | | | 59/84 |
| 2010/0078108 A1 * | 4/2010 | Pengg | ................... | B60C 27/086 |
| | | | | 152/243 |
| 2013/0312884 A1 * | 11/2013 | Schmid | ................. | B60C 27/086 |
| | | | | 152/208 |
| 2015/0101834 A1 * | 4/2015 | Way | ........................ | A01B 29/04 |
| | | | | 172/146 |
| 2017/0368581 A1 * | 12/2017 | Lokkinen | .............. | B08B 9/0436 |
| 2018/0126430 A1 * | 5/2018 | Lokkinen | ................ | E03F 9/002 |
| 2018/0184569 A1 * | 7/2018 | Kelly | .................. | A01B 33/024 |
| 2021/0059093 A1 * | 3/2021 | Kovach | ................ | A01B 29/048 |

FOREIGN PATENT DOCUMENTS

| | | |
|---|---|---|
| RU | 173 235 U1 | 8/2017 |
| SU | 1653559 A1 | 6/1991 |

OTHER PUBLICATIONS

"Early Strip-Till Returns Encourage Experimentation", Strip Till Farmer, Seeding & Planting, Nutrient Management, Kuhn Krause, Inc., Dec. 8, 2015 (10 pages).

* cited by examiner

ROTARY GROUND ENGAGING TOOL WITH DOUBLE LOOP BARBED LINKS

BACKGROUND OF THE INVENTION

The present invention pertains to agricultural tillage implements and, more specifically, to an auxiliary rotary tool for an agricultural tillage implement.

Farmers utilize a wide variety of tillage implements to prepare soil for planting. Tillage implements prepare the soil by way of mechanical agitation of numerous types, such as digging, stirring, and overturning. Examples of tillage include plowing (overturning with moldboards or chiseling with chisel shanks), disking, harrowing, sweeping, and cultivating with cultivator shanks. Tillage implements are often classified into two types: vertical or horizontal tillage. Generally, vertical tillage is performed with implements such as coulters or spider wheels. Horizontal tillage, on the other hand, is performed with implements such as sweeps. The employment of vertical and/or horizontal tillage depends upon various aspects of a given situation including soil conditions, equipment, crops to be planted, etc.

Some tillage implements may include two or more sections coupled together to perform multiple functions as they are pulled through fields by an agricultural vehicle. For example, a field cultivator is capable of simultaneously tilling soil and leveling the tilled soil in preparation for planting. Field cultivators convert compacted soil into a level seedbed with a consistent depth for providing optimal conditions for planting of a crop. Residual crop material, weeds, or other undesired plants disposed on top of the soil are destroyed and worked into the soil.

A typical field cultivator generally includes a frame that carries a number of ground-engaging tools for working the soil. The tools may include shovels, knives, points, sweeps, coulters, spikes, or plows. For example, a field cultivator may include shank assemblies for creating a level seedbed to facilitate optimal seed growth. Some field cultivators may also include rear auxiliary tools to perform various secondary tasks for finishing the soil. For example, a field cultivator may also include a spike tooth harrow, spring tooth harrow, rolling (aka. crumbler) basket, etc., or any combination thereof for finishing the soil.

A typical rolling basket includes has a reel with numerous horizontally disposed blades. As the rolling basket contacts the ground, it rotates and the blades accordingly break up dirt and sod clods into smaller sizes. The blades may also chop the remaining debris on the top of the soil, smooth out ridges, and slightly pack the field. However, the due to the limited cutting depth of the blades and/or the wear on the blades, the rolling basket may undesirably finish the soil. For example, the blades may undesirably leave coarse objects, such as soil clods or other debris, on the surface of the field.

What is needed in the art is a cost-effective auxiliary rotary tool for creating a smoother and finer strip of soil.

SUMMARY OF THE INVENTION

In one exemplary embodiment formed in accordance with the present invention, there is provided a rolling basket assembly that generally includes a bracket, an axle, a pair of disks mounted to the bracket, and multiple chain assemblies interconnected between the disks. Each chain assembly includes multiple links which together form the chain assembly. The links are double loop, barbed links that each include two loops and two projections extending from the loops. The links are configured for engaging the soil and creating a fine, loosened, and smooth strip of soil.

In another exemplary embodiment formed in accordance with the present invention, there is provided a rolling basket assembly for an agricultural tillage implement. The rolling basket assembly includes a bracket configured for connecting to the agricultural tillage implement, a first disk and a second disk configured for being rotatably connected to the bracket and spaced apart from one another by a distance, and a plurality of chain assemblies. Each chain assembly includes a first end connected to the first disk and a second end connected to the second disk such that each chain assembly spans the distance between the first disk and the second disk. Each chain assembly also includes a plurality of links looped around one another and collectively forming each chain assembly. Each link includes a first loop, a second loop that is looped around the first loop, and at least one projection extending outwardly from one of the first loop and the second loop.

In yet another exemplary embodiment formed in accordance with the present invention, there is provided an agricultural tillage implement for an agricultural vehicle including a frame and at least one rolling basket assembly. Each rolling basket assembly includes a bracket connected to the frame, a first disk and a second disk configured for being rotatably connected to the bracket and spaced apart from one another by a distance and a plurality of chain assemblies. Each chain assembly includes a first end connected to the first disk and a second end connected to the second disk such that each chain assembly spans the distance between the first disk and the second disk. Each chain assembly also includes a plurality of links looped around one another and collectively forming each chain assembly. Each link includes a first loop, a second loop that is looped around the first loop, and at least one projection extending outwardly from one of the first loop and the second loop.

One possible advantage of the exemplary embodiment of the rolling basket assembly is that each chain assembly has interlocking double loop barbed links, and each link is integrally formed which reduces manufacturing cost and decreases the time required for assembly.

Another possible advantage of the exemplary embodiment of the rolling basket assembly is that the chain assemblies efficiently break up clods of soil and other debris to desirably finish the soil.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "forward", "rearward", "left" and "right", when used in connection with the agricultural tillage implement and/or components thereof are usually determined with reference to the direction of forward operative travel of the agricultural vehicle, but they should not be construed as limiting. The terms "longitudinal" and "transverse" are determined with reference to the fore-and-aft direction of the agricultural tillage implement and are equally not to be construed as limiting.

Figure 1:
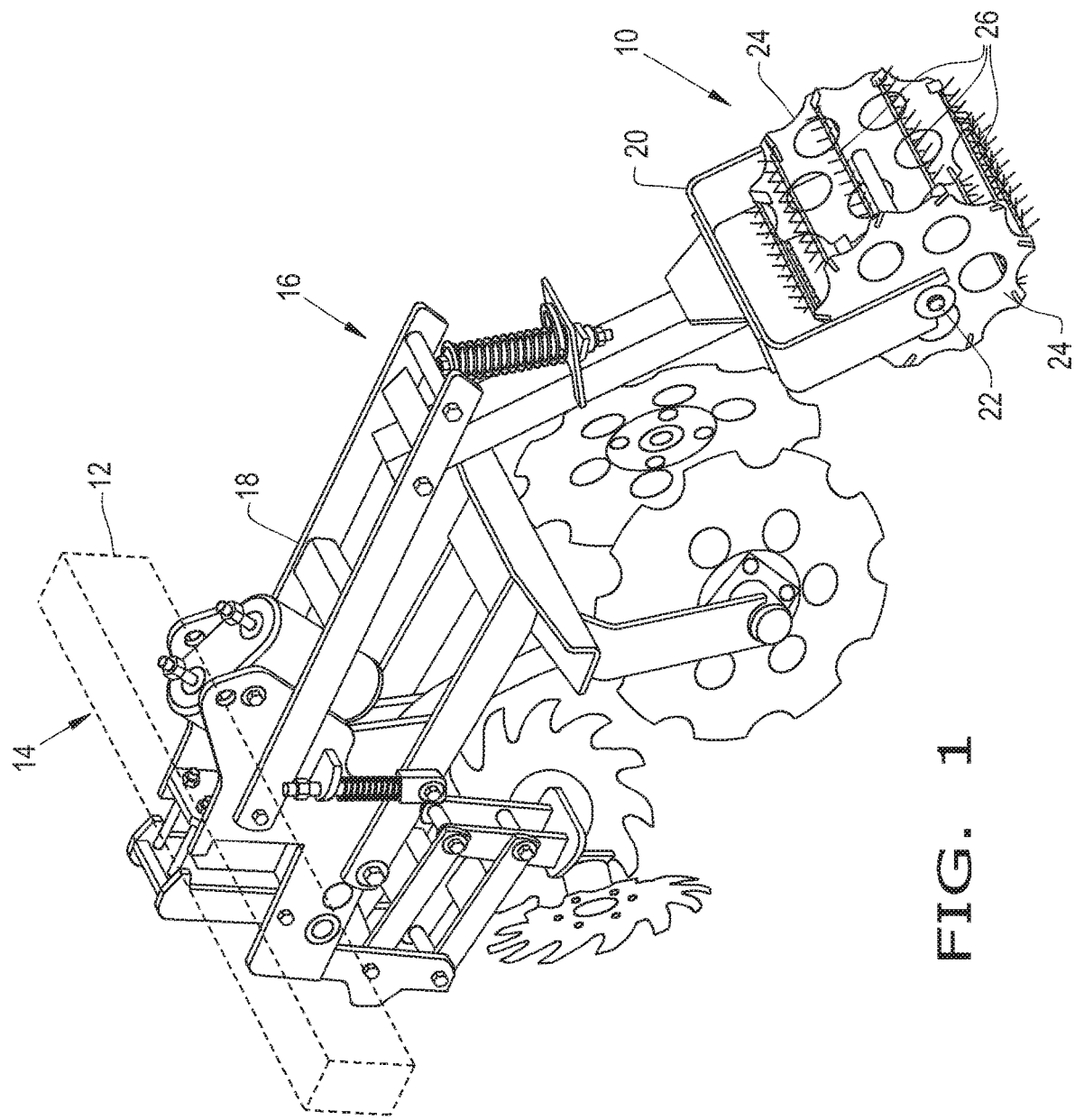
FIG. 1 illustrates a perspective view of an exemplary embodiment of a rolling basket assembly, which includes a basket formed by end plates and chain assemblies, in accordance with an exemplary embodiment of the present invention.
Figure 2:
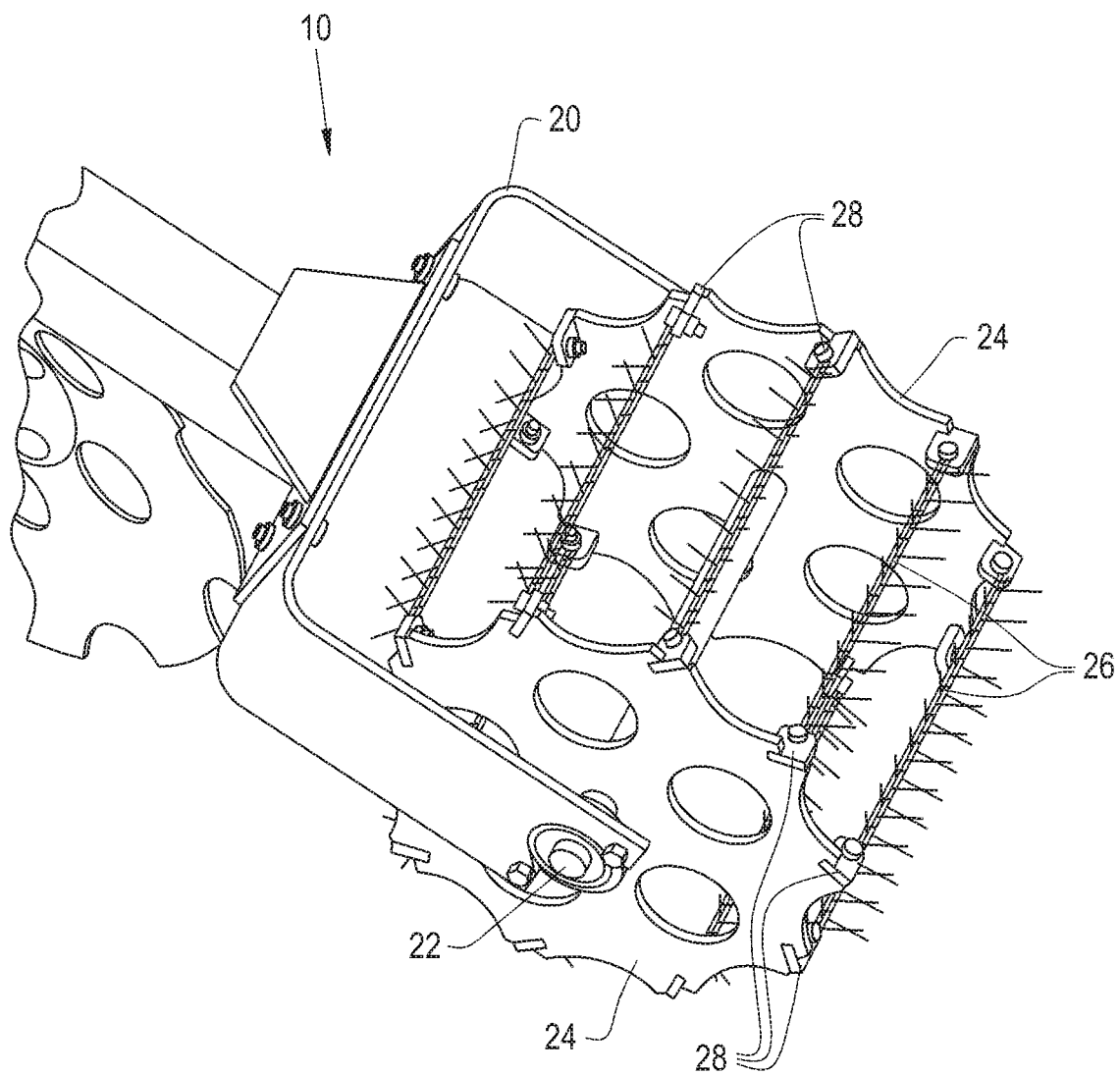
FIG. 2 illustrates a perspective view of the basket of the rolling basket assembly of FIG. 1.

Referring now to the drawings, and more particularly to FIGS. 1-2, there is shown a rolling basket assembly 10 that is connected to the main frame 12 of an agricultural tillage implement 14. The rolling basket assembly 10 can be a separate unit attached to the main frame 12 or may be incorporated as part of a primary or secondary ground-engaging tool assembly. For example, the rolling basket assembly 10 can be incorporated as part of a ground-engaging tool assembly 16 that has its own subframe 18, which in turn connects the rolling basket assembly 10 to the main frame 12. The ground-engaging tool assembly 16 which incorporates the rolling basket assembly 10 may also include various other tools, such as cutters, disks, etc.

The agricultural tillage implement 14 may be towed behind an agricultural vehicle, such as a tractor. The agricultural tillage implement 14 may be in the form of any desired implement, such as strip-till implement, a disk ripper, or a field cultivator. As can be appreciated, the agricultural tillage implement 14 can include only one or multiple rolling basket assemblies 10.

The rolling basket assembly 10 generally includes a bracket 20 which is connected to the subframe 18, a support rod or axle 22 which is rotatably connected to the bracket 20, a pair of disks 24 mounted on the axle 22, and multiple chain assemblies 26 interconnected and spanning the distance in between the disks 24. It should be appreciated that the axle 22, disks 24, and chain assemblies 26 may together define the basket portion of the rolling basket assembly 10. In operation, as the disks 24 rotate, the chain assemblies 26 engage the soil and create a fine, loosened, and smooth strip of soil or berm.

The bracket 20 can be in the form of a "U"-shaped bracket with a pair of receiving holes for mounting the axle 22, and the bracket 20 can comprise any desired material, such as metal. The axle 22 may further include multiple bearings for rotatably mounting the body of the axle 22 to the bracket 20. The axle 22 defines a horizontal axis of rotation about which the disks 24 and chains 26 rotate. The axle 22 may comprise any desired material, such as metal. The disks 24 can be fixed to the axle 22 and may also be configured for engaging and breaking up the soil. Each disk 24 may include mounting members 28, e.g. mounting tabs or plates 28, for mounting the chain assemblies 26 circumferentially around the outer perimeter of each respective disk 24 (FIG. 2). The mounting members 28 can be integrally formed with the main body of the disks 24 and/or separate elements which are affixed to the main body of the disks 24. For instance, the mounting members 28 can be in the form of separate plates 28. Each plate 28 can have a first end fixedly attached, e.g. welded, to a respective disk 24 and a second end connected to a respective chain assembly 26. The disks 24 can be in the form of any desired annular plates and may comprise any desired shape and material.

Each chain assembly 26 can be removably attached to the disks 24. For example, a respective end of the chain assembly 26 can be fastened to a respective mounting member 28 by way of a fastener disposed within a corresponding receiving hole of the respective mounting member 28 (unnumbered). Furthermore, it should be appreciated that a respective mounting member 28 can have two receiving holes for adjustably mounting the chain assembly 26 such that the chain assembly 26 can either be mounted to a nearer receiving hole which allows the chain assembly 26 to be flexible or a further-away receiving hole which keeps the chain assembly 26 taut. However, each chain assembly 26 can be connected to the disks 24 by being fastened directly to the main body of the disks 24, welded to the disks 24, and/or looped through a respective receiving hole in the disks 24. The chain assemblies 26 are shown to span the distance between the disks 24. In this regard, each chain assembly 26 can be taut in between the disks 24 or slightly longer than the distance between the disks 24 such that each chain assembly 26 is flexible or flexes upon contacting the field. As used herein, "taut" may refer to a chain assembly 26 which is substantially straight or not connected to the disks 24 in a manner that allows the chain assembly 26 to concave inwardly, which would create a rounded or mound-like strip of soil. It should be appreciated that if each chain assembly 26 is slightly longer, e.g. by one or two chain-link lengths, than the distance between the disks 24, the chain assemblies 26 will accordingly create a taller or more rounded strip.

Figure 3:
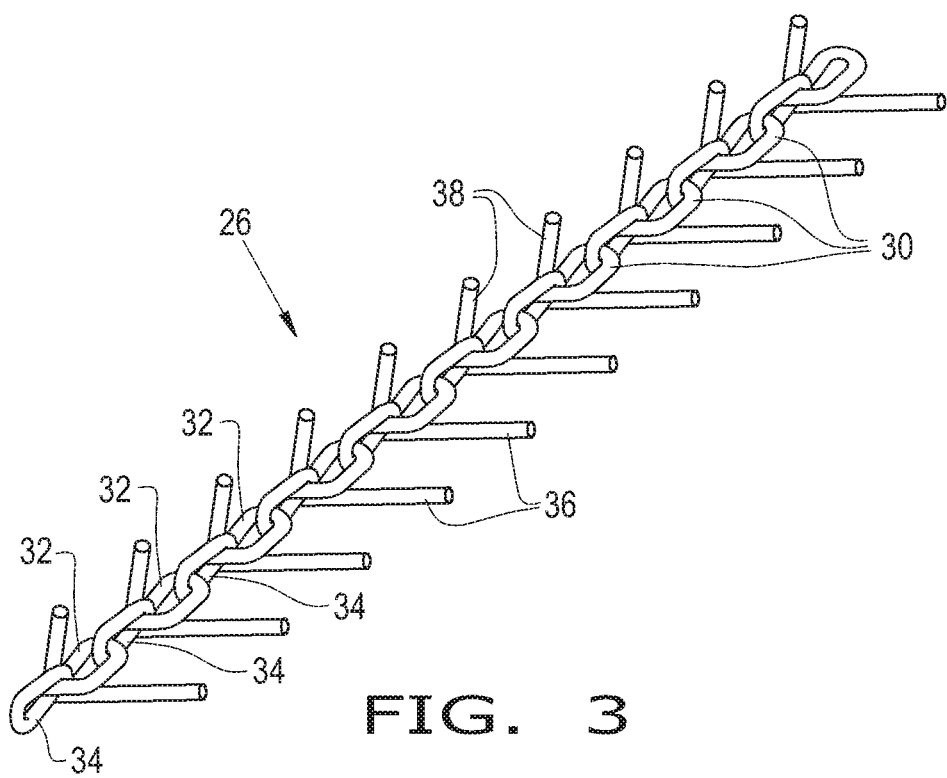
FIG. 3 illustrates a perspective view of a chain assembly for the basket of the rolling basket assembly.
Figure 4:
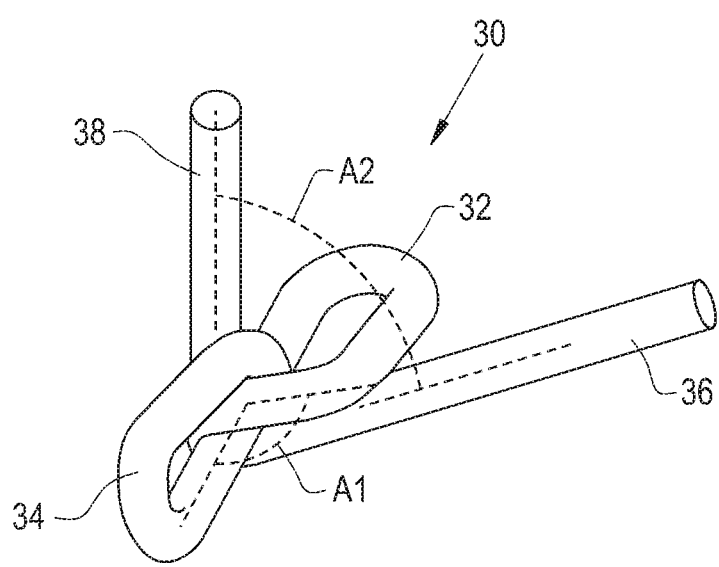
FIG. 4 illustrates a single link of the chain assembly for the basket of the rolling basket assembly.

Referring now collectively to FIGS. 2-4, there is shown an isolated chain assembly 26 which is comprised of multiple double loop, barbed links 30, which are looped around one another for collectively forming each chain assembly 26. Each link 30 has a first loop 32, a second loop 34 that is looped around the first loop 32, and at least one projection 36, 38 extending outwardly from the first and/or second loops 32, 34 (FIG. 4). Since each link 30 has two loops 32, 34, the links 30 interconnect in a manner wherein the first loop 32 of a respective link 30 wraps or loops around the second loop 34 of an adjacent link 30, and so forth (FIG. 3). The loops 32, 34 can be offset from one another by a set angle A1 (FIG. 4). For example, the planes in which the loops 32, 34 reside can be offset from one another by approximately 90 degrees, plus or minus 10 degrees. Each projection 36, 38 extends outwardly from and at least partially contacts the loops 32, 34, respectively. The projections 36, 38 can be offset or form an angle A2 relative to one another (FIG. 4). For example, the planes in which projections 36, 38 reside can form an acute angle A2 relative to one another. However, the projections 36, 38 may form any desired angle relative to one another and/or the loops 32, 34. Each projection 36, 38 may be in the form of a barb or tine. The projections 36, 38 are configured for jutting into the ground in order to break up and loosen the soil. Each link 30 can be a monolithically formed link 30 so that the loops 32, 34 and the projections 36, 38 are integrally formed with one another. Alternatively, the projections may be welded onto the loops 32, 34, respectively. The links 30 may comprise any desired material, such as metal.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A rolling basket assembly for an agricultural tillage implement, comprising:
a bracket configured for connecting to the agricultural tillage implement;
a first disk and a second disk configured for being rotatably connected to the bracket and spaced apart from one another by a distance; and
a plurality of chain assemblies operably coupled with the first disk and the second disk, the first disk and the second disk each defining a concave surface between adjacently coupled chain assemblies of the plurality of chain assemblies, each chain assembly comprising:
a first end connected to the first disk and a second end connected to the second disk such that each chain assembly spans the distance between the first disk and the second disk; and
a plurality of links looped around one another and collectively forming each chain assembly, and each link comprising a first loop configured to couple with a first adjacent link, a second loop that is looped around the first loop and configured to couple with a second adjacent link, and at least one projection extending outwardly of one of the first loop and the second loop,
wherein the first loop of each link extends at least partially outward of the at least one projection on a first side of the at least one projection and the second loop of each link extends at least partially outward of the at least one projection on a second, opposite side of the at least one projection.

2. The rolling basket assembly of claim 1, wherein the plurality of links are looped around one another so that a respective first loop of a respective link is looped around an adjacent second loop of an adjacent link.

3. The rolling basket assembly of claim 1, wherein the first loop and the second loop of each link are offset from one another by approximately 90 degrees.

4. The rolling basket assembly of claim 1, wherein the at least one projection of each link comprises a pair of projections respectively extending outwardly from the first loop and the second loop.

5. The rolling basket assembly of claim 4, wherein each link is monolithically formed such that the pair of projections are integrally formed with the first and second loops of each link.

6. The rolling basket assembly of claim 4, wherein the pair of projections form an acute angle relative to one another.

7. The rolling basket assembly of claim 4, wherein the pair of projections at least partially contact the first loop and the second loop, respectively.

8. The rolling basket assembly of claim 1, wherein each disk comprises a plurality of mounting members for mounting the first and second ends of each chain assembly.

9. The rolling basket assembly of claim 8, wherein the plurality of mounting members are each in the form of a mounting plate configured for receiving a fastener for removably connecting each chain assembly to the first and second disks.

10. The rolling basket assembly of claim 1, further comprising an axle rotatably connected to the bracket and mounting the first disk and the second disk.

11. An agricultural tillage implement for an agricultural vehicle, comprising:
a frame; and
at least one rolling basket assembly, comprising:
a bracket connected to the frame;
a first disk and a second disk configured for being rotatably connected to the bracket and spaced apart from one another by a first transverse distance, the first disk positioned laterally inwardly of a first side portion of the bracket and the second disk positioned laterally inward of a second side portion of the bracket;
a plurality of mounting members mounted to each of the first disk and the second disk, the plurality of mounting members mounted on the first disk extending towards the second disk and laterally outward of the first disk to a position between the first disk and the first side portion of the bracket, and the plurality of mounting members mounted on the second disk extending towards the first disk and laterally outward of the second disk to a position between the second disk and the second side portion of the bracket; and
a plurality of chain assemblies, wherein each chain assembly is coupled with one of the plurality of mounting members mounted on the first disk and one of the plurality of mounting members mounted on the second disk to span a second transverse distance that is less than the first transverse distance, each chain assembly, comprising:
a first end connected to one of the plurality of mounting members mounted on the first disk and a second end connected to one of the plurality of mounting members mounted on the second disk such that each chain assembly spans the distance between the first disk and the second disk; and
a plurality of links looped around one another and collectively forming each chain assembly, and each link comprising a first loop, a second loop that is looped around the first loop, and at least one projection extending outwardly of one of the first loop and the second loop.

12. The agricultural tillage implement of claim 11, wherein the plurality of links are looped around one another so that a respective first loop of a respective link is looped around an adjacent second loop of an adjacent link.

13. The agricultural tillage implement of claim 11, wherein the first loop and the second loop of each link are offset from one another by approximately 90 degrees.

14. The agricultural tillage implement of claim 11, wherein the at least one projection of each link comprises a pair of projections respectively extending outwardly from the first loop and the second loop.

15. The agricultural tillage implement of claim 14, wherein each link is monolithically formed such that the pair of projections are integrally formed with the first and second loops of each link.

16. The agricultural tillage implement of claim 14, wherein the pair of projections form an acute angle relative to one another.

17. The agricultural tillage implement of claim 14, wherein the pair of projections at least partially contact the first loop and the second loop, respectively.

18. The agricultural tillage implement of claim 11, wherein the plurality of mounting members are each in the form of a mounting plate configured for receiving a fastener for removably connecting each chain assembly to the first and second disks.

19. The agricultural tillage implement of claim 11, wherein the at least one rolling basket assembly further comprises an axle rotatably connected to the bracket and mounting the first disk and the second disk.

20. A rolling basket assembly for an agricultural tillage implement, comprising:
- a bracket configured for connecting to the agricultural tillage implement;
- a first disk configured for being rotatably connected to the bracket;
- a first mounting member operably coupled with the first disk;
- a second disk configured for being rotatably connected to the bracket and spaced apart from the first disk;
- a second mounting member operably coupled with the second disk; and
- a chain assembly formed from a plurality of links looped around one another, wherein each link comprises a first loop, a second loop, and at least one projection extending outwardly from one of the first loop and the second loop, the first loop extending at least partially outward of the at least one projection on a first side of the at least one projection and the second loop extending at least partially outward of the at least one projection on a second, opposite side of the at least one projection,
- wherein a first link of the plurality of links is operably coupled with the first mounting member with a first fastener positioned through the first loop of the first link, the first fastener positioned fully inward of the first disk and the second disk in a transverse direction, and a second link of the plurality of links is operably coupled with the second mounting member with a second fastener positioned through the second loop of the second link, the second fastener positioned fully inward of the first disk and the second disk in the transverse direction.

* * * * *